(No Model.) 3 Sheets—Sheet 1.
J. M. GETTEL, H. C. GRITTINGER & J. H. KILLINGER.
WINCH.
No. 350,926. Patented Oct. 19, 1886.
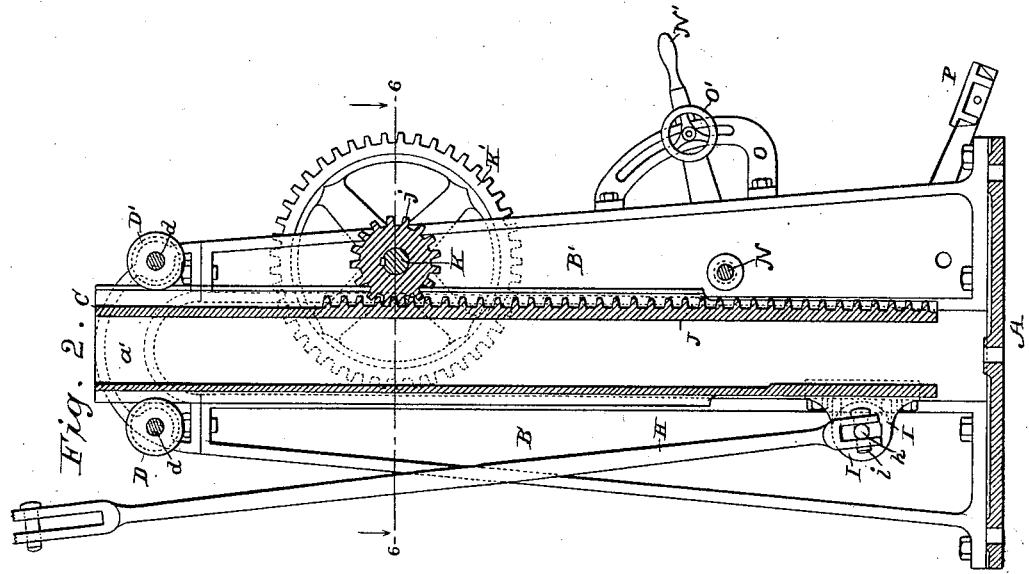
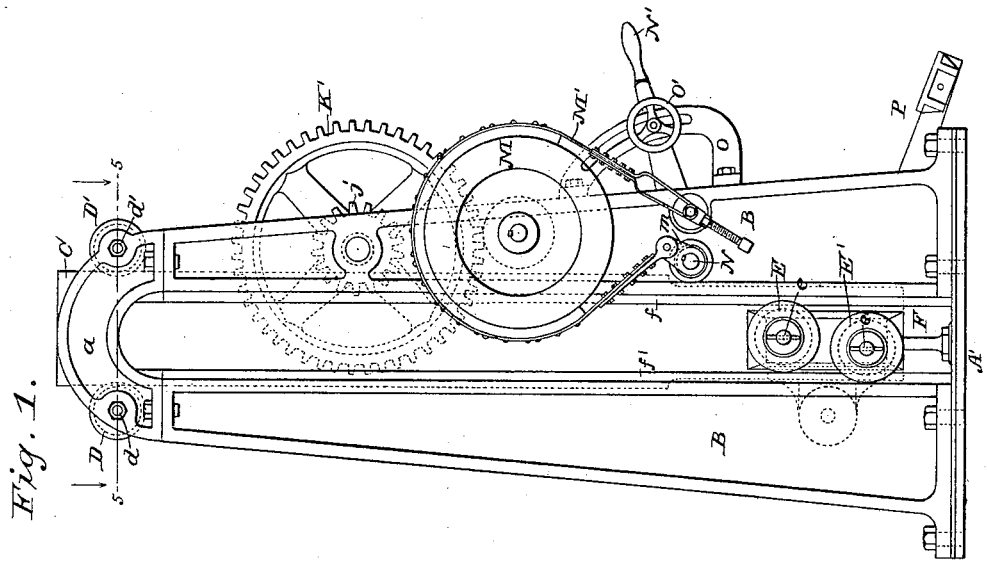
WITNESSES
Ed. A. Newman.
Al. C. Newman.
By their Attorneys
Baldwin, Hopkins & Payton
INVENTORS
J. M. Gettel,
H. C. Grittinger,
J. H. Killinger, (No Model.) 3 Sheets—Sheet 2.

J. M. GETTEL, H. C. GRITTINGER & J. H. KILLINGER.
WINCH.

No. 350,926. Patented Oct. 19, 1886.

WITNESSES
Ed. A. Newman
Al. C. Newman

INVENTORS
J. M. Gettel,
H. C. Grittinger,
J. H. Killinger,
By their Attorneys
Baldwin, Hopkins & Peyton.

(No Model.) 3 Sheets—Sheet 3.

J. M. GETTEL, H. C. GRITTINGER & J. H. KILLINGER.
WINCH.

No. 350,926. Patented Oct. 19, 1886.

WITNESSES
Ed. A. Newman.
Al. C. Newman.

By their Attorneys

INVENTORS
J. M. Gettel,
H. C. Grittinger,
J. H. Killinger.

UNITED STATES PATENT OFFICE.

JOSIAH M. GETTEL, OF LEBANON, HENRY C. GRITTINGER, OF CORNWALL, AND JOHN H. KILLINGER, OF LEBANON, PENNSYLVANIA; SAID GRITTINGER AND KILLINGER ASSIGNORS TO SAID GETTEL.

WINCH.

SPECIFICATION forming part of Letters Patent No. 350,926, dated October 19, 1886.

Application filed July 14, 1886. Serial No. 207,979. (No model.)

*To all whom it may concern:*

Be it known that we, JOSIAH M. GETTEL, of Lebanon, HENRY C. GRITTINGER, of Cornwall, and JOHN H. KILLINGER, of Lebanon, all in the county of Lebanon and State of Pennsylvania, have invented certain new and useful Improvements in Winches, of which the following is a specification.

Our invention relates to certain improvements, to be specified by the claims, in winches of the class having reciprocating racks, by way of which and connecting-rods the power is applied; and our object, mainly, is to provide a winch especially adapted for controlling the operations of furnace-charging bells, such as shown in our application No. 201,470 for United States Letters Patent, filed May 7, 1886.

Figure 3:
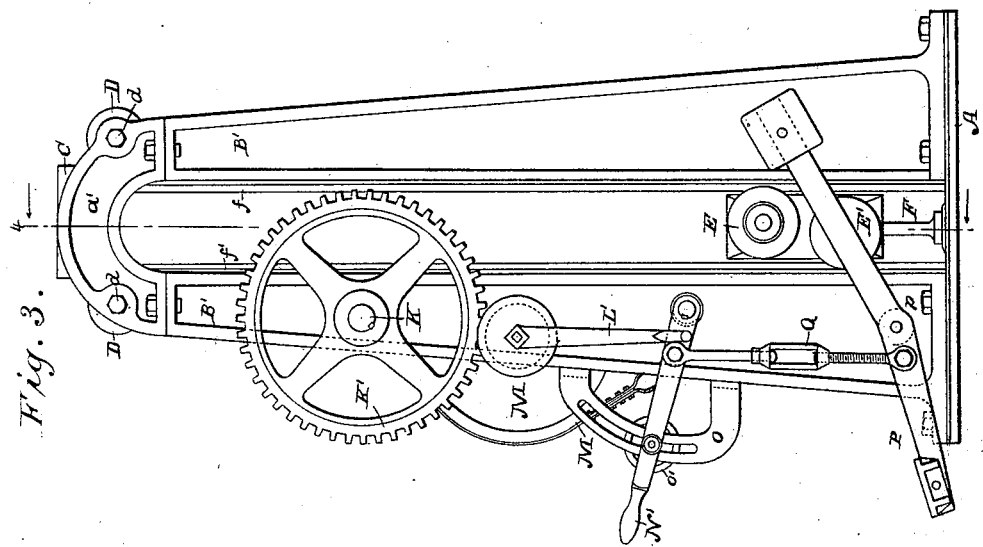
Figure 4:
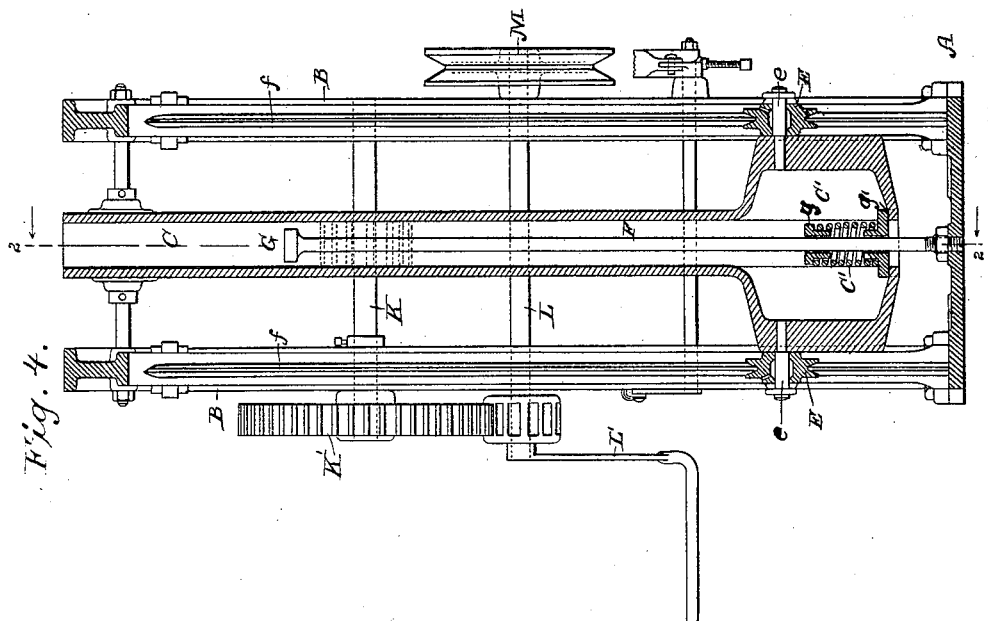
Figure 6:
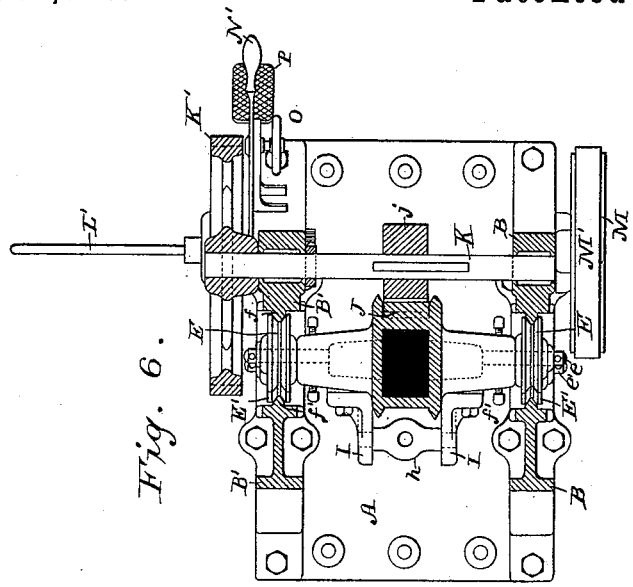
Figure 5:
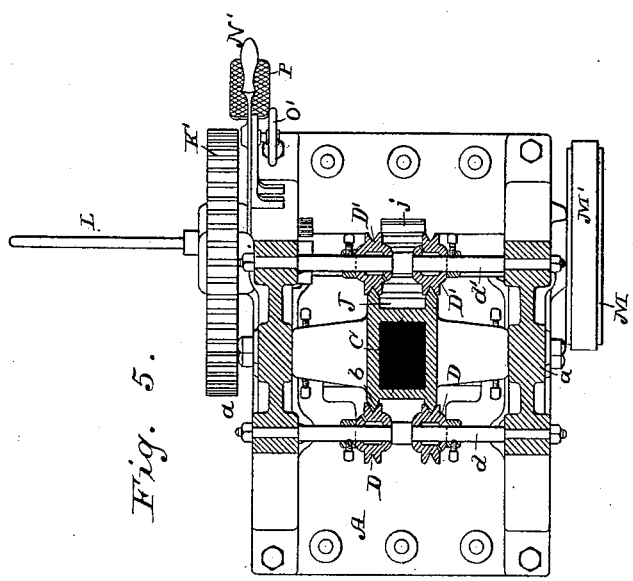

In the accompanying drawings, Figure 1 is a side elevation of our improved winch. Fig. 2 is a view partly in elevation and partly in vertical section on the line 2 of Fig. 4, with the yielding rack check or buffer omitted. Fig. 3 is an elevation showing the side opposite that represented by Fig. 1. Fig. 4 is a view partly in elevation and partly in vertical section on the line 4 of Fig. 3. Fig. 5 is a view partly in plan and partly in horizontal section on the line 5 of Fig. 1; and Fig. 6, a similar view, the section being on the line 6 of Fig. 2.

The winch-frame is shown as formed of the base-plate A, four uprights, B B B' B', and top sections, a a'. The uprights are bolted at their bases to the base-plate and arranged in pairs, with spaces between the uprights of the respective pairs, the uprights B B of the pair for one side of the frame being united and maintained at proper distance apart at top by the top section a, bolted in place, and the uprights B' B' of the other side of the frame being similarly connected by the top section a'. The spaces in the sides of the frame between the uprights receive guideway-rollers, as in turn to be explained. A slide, consisting of the long hollow upright portion C, rectangular in cross-section, with the cross-head C', also hollow at its lower end, is supported in the frame between its opposite sides, and reciprocates vertically. As shown, the slide is mounted and guided in its reciprocations as follows: The portion C of the slide is provided with the four doubly-beveled corner guideway-flanges. b, extending lengthwise of it, and having guideway-contact with the grooved guide-rollers D D, D' D'. These guide-rollers are arranged in pairs to rotate upon rods d d', which are reduced at their ends and shouldered and provided with screw-threads. The reduced threaded ends of the rods pass through the top sections, a a', at opposite sides of the frame, and nuts secure the rods in place with their shoulders against the inner sides of the frame, the rods serving to brace or tie together the opposite sides of the frame, as will be made plain by inspection of Fig. 5. The pair of guide-rollers D D for one side of the slide are upon the tie-rod d, and the tie-rod d' carries the pair of rollers D' D' for the opposite side of the slide. Two pairs of grooved guide-rollers, E E, E' E', are carried in their receiving-spaces in the sides of the frame by the cross-head of the slide upon studs e e, e' e', secured to its ends. The pair of rollers E E upon the studs e e at opposite ends of the cross-head rotate with their grooves in contact with the doubly-beveled guideway-flanges f f at the inner edges of the diametrically-opposite uprights B B', and the pair of rollers E' E' rotate in contact with the similar guideway-flanges, f' f', of the two other uprights. The width of the roller-receiving spaces—that is to say, the distance between the flanges f f' of adjacent uprights—is greater than the diameter of the rollers, and the rollers E E, instead of being directly over their respectively-adjacent rollers E' E', have their studs arranged in a vertical plane slightly to one side of that in which the studs for the other rollers are located. In this way provision is made for the rotations in opposite directions of the rollers as they reciprocate in contact with their respective guideway-flanges. It will be seen that, with the frame and slide formed as above explained, the rollers carried by the slide, together with those carried by the frame, insure a direct up-and-down movement of the slide as it is reciprocated by means such as further on to be explained. A slide check or buffer for gradually arresting the movement of the slide at the limit of its upward stroke to prevent violent shocks or injurious strains of the mechanism is shown as formed by a rod, F, secured at its lower end by a screw and nut to the frame-base, extending upward with the hollow slide, provided at its upper end with the head or fixed collar G, and having a strong coiled spring, G', encircling it near its lower end, and supported by and moving with the slide endwise of the rod. This buffer-spring loosely embraces the buffer-rod and engages bossed washers $g$ $g'$ at its opposite ends. These washers fit loosely about the rod, so as to slide upon it, and the lower one, $g'$, rests upon the inner surface of the bottom of the cross-head slide and over the opening therein. It will be seen that about at the completion of the upward movement of the slide the spring is compressed and gradually arrests the movement of the slide. A connecting-rod, H, is suitably jointed at its opposite ends, respectively, to the slide and to a lever, rocking arm, &c., to be moved to and fro. As shown, the lower end of the connecting-rod is forked, embraces a cross-head pivot, $h$, rocking in bearings in lugs I I, bolted to one side of the slide cross-head, and is secured to this pivot by a pin, $i$, passing through it and through openings in the forks of the connecting-rod. The rod may obviously be rendered adjustable by providing a series of holes in its forks. The slide is toothed to form a rack, J, upon one side, which is engaged by a pinion, $j$, on a cross-shaft, K, mounted in bearings in the opposite sides of the frame, and having a gear, K', fast on one of its ends. A driving-shaft, L, provided with a crank and handle, L', at one end, (or it may be at both ends in some cases,) for turning it, has a pinion fast upon it and engaging the gear K' to rotate the shaft K for actuating the slide by way of its rack and the pinion meshing therewith.

For arresting and controlling the movements of the slide, brake mechanism is provided as follows: A brake-wheel, M, is fastened to the driving-shaft at the end opposite that to which the crank is shown as applied, and a brake-strap, M', provided with a suitable lining or shoe, embraces this brake-wheel and is adjustably attached at one end to the frame. The opposite end of the brake-strap is attached to the crank $m$ of a rock-shaft, N, to which the inner end of the brake-lever N' is secured. Clamping or detent devices for holding the brake-lever in its adjustable position consist, as shown, of the slotted bracket O, secured to the frame, a threaded pin secured at one end to the lever and projecting through the curved slot of the bracket, and a hand-wheel, O', having a threaded hub engaging the pin, so that by turning this wheel it may be jammed against the bracket to lock the lever against movement. A counterbalanced foot-treadle, P, pivoted at $p$ to the frame, is also provided for controlling the brake-lever. This treadle is adjustably connected with the brake-lever by means of link-rods and the turn-buckle Q, as plainly shown by Fig. 3.

We claim as our own invention—

1. The combination of the frame having the guideway-flanges and the roller-receiving spaces in opposite sides, the slide mounted within the frame and provided with the cross-head and guideway-flanges, the guide-rollers carried by the frame, and the guide-rollers carried by the cross-head of the slide and of diameter less than the width of their receiving-spaces in the sides of the frame, substantially as and for the purpose set forth.

2. The combination of the frame, the reciprocating hollow slide, the headed buffer-rod secured to the frame and extending into the slide, and the buffer-spring supported by and moving with the slide and loosely embracing and moving endwise of the buffer-rod, substantially as and for the purpose set forth.

3. The combination of the base, the four uprights secured in pairs thereto with the roller-receiving spaces between them, the top sections by which the uprights of the respective pairs are united, and the tie-rods passing through the top sections and uniting the opposite sides of the frame, substantially as and for the purpose set forth.

4. The combination of the frame having guideway-flanges, the slide mounted in the frame and provided with the cross-head, guideway-flanges, and rack, the guide-rollers of the frame, the guide-rollers of the cross-head of the slide, the driving-shaft, the shaft geared therewith, and the pinion engaging the rack of the slide, substantially as and for the purpose set forth.

5. The combination of the frame, the reciprocating slide provided with the rack, the driving-shaft, the shaft geared therewith, the pinion engaging the rack of the slide, the brake mechanism, and the detent devices therefor, substantially as and for the purpose set forth.

6. The combination of the frame having guideway-flanges, the slide mounted in the frame and provided with the cross-head, guideway-flanges, and rack, the guide-rollers of the frame, the guide-rollers of the cross-head of the slide, the driving-shaft, the shaft geared therewith and with the rack of the slide, the brake mechanism, and the detent devices therefor, substantially as and for the purpose set forth.

In testimony whereof we have hereunto subscribed our names.

JOSIAH M. GETTEL.
HENRY C. GRITTINGER.
JOHN H. KILLINGER.

Witnesses:
JOHN HUNSICKER,
E. W. STONER.